(12) United States Patent
Rasmussen (10) Patent No.: US 8,606,579 B2
(45) Date of Patent: Dec. 10, 2013

(54) VOICE PRINT IDENTIFICATION FOR IDENTIFYING SPEAKERS

(75) Inventor: David John Rasmussen, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 580 days.

(21) Appl. No.: 12/786,259

(22) Filed: May 24, 2010

(65) Prior Publication Data

US 2011/0288866 A1    Nov. 24, 2011

(51) Int. Cl.
*G10L 21/02*      (2013.01)

(52) U.S. Cl.
USPC .................................................. 704/246

(58) Field of Classification Search
USPC ...................................................... 704/246
See application file for complete search history.

(56) References Cited

U.S. PATENT DOCUMENTS

| | | | | |
|---|---|---|---|---|
| 5,806,040 A * | 9/1998 | Vensko | | 704/273 |
| 6,728,679 B1 * | 4/2004 | Strubbe et al. | | 704/270.1 |
| 6,731,307 B1 * | 5/2004 | Strubbe et al. | | 715/727 |
| 6,795,808 B1 * | 9/2004 | Strubbe et al. | | 704/275 |
| 7,251,786 B2 | 7/2007 | Wynn et al. | | 715/744 |
| 7,403,766 B2 * | 7/2008 | Hodge | | 455/411 |
| 7,487,112 B2 * | 2/2009 | Barnes, Jr. | | 705/26.8 |
| 7,603,273 B2 | 10/2009 | Poirier | | 704/235 |
| 7,679,518 B1 | 3/2010 | Pabla et al. | | 340/573.1 |
| 7,702,730 B2 * | 4/2010 | Spataro et al. | | 709/205 |
| 8,140,340 B2 * | 3/2012 | Bhogal et al. | | 704/273 |
| 2003/0004776 A1 | 1/2003 | Perrella et al. | | 705/9 |
| 2004/0210637 A1 * | 10/2004 | Loveland | | 709/204 |
| 2006/0248144 A1 * | 11/2006 | Zhu et al. | | 709/205 |
| 2007/0055439 A1 * | 3/2007 | Denker et al. | | 701/200 |
| 2007/0241861 A1 * | 10/2007 | Venkatanna et al. | | 340/5.52 |
| 2008/0189159 A1 | 8/2008 | Jain et al. | | 705/8 |
| 2009/0046841 A1 * | 2/2009 | Hodge | | 379/189 |
| 2009/0177476 A1 | 7/2009 | Darrell et al. | | 704/275 |
| 2009/0204414 A1 | 8/2009 | Shah | | 705/1.1 |
| 2009/0204904 A1 | 8/2009 | Mujkic et al. | | 715/753 |

FOREIGN PATENT DOCUMENTS

| | | |
|---|---|---|
| JP | 2003506906 A | 2/2003 |
| JP | 2008160667 A | 7/2008 |
| JP | 2008294619 A | 12/2008 |
| JP | 2010060850 A | 3/2010 |

OTHER PUBLICATIONS

International Search Report and Written Opinion in Application PCT/US2011/035799 mailed Dec. 26, 2011, 8 pages.

* cited by examiner

*Primary Examiner* — Michael N Opsasnick (74) *Attorney, Agent, or Firm* — Merchant & Gould

(57) ABSTRACT

Voice print identification for identifying speakers may be provided. A plurality of speakers are recorded and associated with identity indicators. Voice prints for each speaker are associated with the plurality of recorded speakers. If the voice print for at least one speaker corresponds to a known user according to the identity indicators, a database entry associating the user with the voice print may be created. Additional information associated with the user may also be displayed.

20 Claims, 5 Drawing Sheets

Identity Indicator Table — 250

| Event | User | Indicator |
|---|---|---|
| 37125 | | Location: Conference Room 1 |
| 37215 | jsmith | BT: 3478-1745-0987 |
| 37215 | | MAC: 00:34:AC:0E:39:92 |
| 37215 | cfrank | MAC: 04:33:28:29:AF:C3 |
| 37215 | | MAC: 39:0A:E3:4C:55:C8 |
| 37215 | jsmith | Host: jsmith |
| 38405 | jsmith | Location: Room 210 |
| 38405 | cfrank | MAC: 04:33:28:29:AF:C3 |
| 38405 | jsmith | BT: 3478-1745-0987 |
| 38405 | jsmith | Host: jsmith |

FIG. 1

Event Presence Table — 200

| Voice Print | Event | Host | Location |
|---|---|---|---|
| 3FE458A0 | 37125 | jsmith | Conf Room 1 |
| 4D2013CA | 37215 | jsmith | Conf Room 1 |
| 9F67A3C4 | 37215 | jsmith | Conf Room 1 |
| 9F67A3C4 | 38405 | jsmith | Room 210 |
| 3FE458A0 | 38405 | jsmith | Room 210 |
| AD4F68E3 | 38405 | jsmith | Room 210 |

*FIG. 2A*

Event Attendee Table — 230

| Event | Host | Attendee | Time | Voice Print |
|---|---|---|---|---|
| 37125 | jsmith | jsmith | 5/1/09 11:00-12:00 | 3FE458A0 |
| 37215 | jsmith | bjones | 5/1/09 11:00-12:00 | |
| 37215 | jsmith | cfrank | 5/1/09 11:00-12:00 | |
| 38405 | jsmith | jsmith | 5/2/09 1:00-2:30 | 3FE458A0 |
| 38405 | jsmith | unknown | 5/2/09 1:00-2:30 | |
| 38405 | jsmith | unknown | 5/2/09 1:00-2:30 | |

*FIG. 2B*

Identity Indicator Table 250

| Event | User | Indicator |
|---|---|---|
| 37125 | | Location: Conference Room 1 |
| 37215 | jsmith | BT: 3478-1745-0987 |
| 37215 | | MAC: 00:34:AC:0E:39:92 |
| 37215 | cfrank | MAC: 04:33:28:29:AF:C3 |
| 37215 | | MAC: 39:0A:E3:4C:55:C8 |
| 37215 | jsmith | Host: jsmith |
| 38405 | jsmith | Location: Room 210 |
| 38405 | cfrank | MAC: 04:33:28:29:AF:C3 |
| 38405 | jsmith | BT: 3478-1745-0987 |
| 38405 | jsmith | Host: jsmith |

VOICE PRINT IDENTIFICATION FOR IDENTIFYING SPEAKERS

BACKGROUND

Voice print identification is a process for creating voice prints and identifying speakers according to various indicators. In some situations, it can be valuable for business logic processes to be able to identify a speaker. For example, a user may enter a meeting with unfamiliar people or be having a conversation in range of a recording device, such as a computer with a microphone. In a later review of notes associated with the meeting or conversation, it could be valuable to know who was speaking when certain notes were taken or to be able to see a color coded stream of the voice recording showing who was speaking when. These rely on the system being able to identify people by voice or other means, but conventional systems require people to register their voice prints in some way. These systems face hurdles to adoption because users are busy and disinclined to participate.

SUMMARY

Voice print learning may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Voice print identification may be provided. A plurality of speakers may be recorded and associated with identity indicators. Voice prints for each speaker may be created. If the voice print for at least one speaker corresponds to a known user according to the identity indicators, a database entry associating the user with the voice print may be created. Additional information associated with the user may also be displayed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Voice print identification may be provided. Consistent with embodiments of the present invention, speakers may be recorded and associated with various ambient indicators. For example, a user may attend a meeting or have a phone call within range of a microphone. A voice print may be generated for each of the speakers and compared to a database of known voice prints. Based on identified speakers, various business logic modules may provide additional functionality such as displaying notes and/or emails from prior meetings, providing a list of attendees, and/or annotating transcripts of the meeting to identify which user spoke at which times. Ambient indicators may be drawn from environmental factors, such as a meeting location or the presence of device identifiers. For example, a user's cellular phone may broadcast a Bluetooth identifier that may be associated with recorded voices and used to associate a voice print with a user. These indicators and generated voice prints may be stored privately by individual users and/or shared among multiple users, such as employees at a company. Generally, the more indicators that are gathered and/or shared, the faster and more accurate correlations between voice prints and identified users may become.

For example, a host user may attend a meeting with nine other users the user has not met before. The host user's voice print database may not comprise any entries that match voice prints generated for the host user and/or the other nine users. The newly generated voice prints may be stored and associated with ambient indicators such as wireless network identifiers, Bluetooth identifiers, the meeting location, and/or calendar appointments.

A calendar appointment may be able to provide a list of attendees at the meeting, so each voice print may be associated with a list of possible users. Other indicators may comprise notes and/or emails the host user creates associated with the meeting. For example, the host user may send an email to three of the attendees comprising action items from the meeting; the action item email may be associated with each of those three attendees. As the user has more meetings with some and/or all of the other nine users those people or subsets of those people, then the correlations may allow isolation of the individual user.

For example, one of the three users may have a telephone call with the host user to discuss the action item email. A voice print may be generated for the other user and ambient indicators (e.g., a Caller ID number) may be associated with the voice print. The voice print may be compared to the voice prints generated during the earlier meeting and a correlation between the user on the call may be made. The Caller ID number may be added to the list of associated ambient indicators associated with that voice print. Further, the Caller ID number may be available in a company directory and be associated with one of the known attendees at the meeting. This may allow a positive identification of the user associated with that voice print. An initial confidence level may be associated with the identified user's voice print that may increase as additional indicators are gathered.

The identification process may occur faster if voice prints and their associated indicator data are shared across a set of individuals. For example, an organization may associate a voice print with each individual as any user data results in a positive identification. The users may not be requires to explicitly record their voice, but once the system has identified a voice print as belonging to a particular individual, the identified voice print may be made available to other users. The identified voice print may then be used to help identify other voice prints, such as by narrowing down a list of attendees. If a meeting has three known attendees of which two have identified voice prints, the third user may be identified as being associated with an unknown voice print recorded during that meeting.

Speaker identification systems may use voice biometrics to identify and/or verify that a given speaker is who they say they are. Voice biometrics may be used by digitizing a profile of a person's speech to produce a stored model voice print, or template. Biometric technology may reduce each spoken word to segments composed of several dominant frequencies called formants. Each segment may comprise several tones that may be captured in a digital format. The tones may collectively identify the speaker's unique voice print. Voice prints may be stored in databases in a manner similar to the storing of fingerprints or other biometric data. Various technologies may be used to process and store voice prints, such as frequency estimation, hidden Markov models, Gaussian mixture models, pattern matching algorithms, neural networks, matrix representation, Vector Quantization, and/or decision trees. Some systems may also use anti-speaker techniques, such as cohort models and world models.

Figure 1:
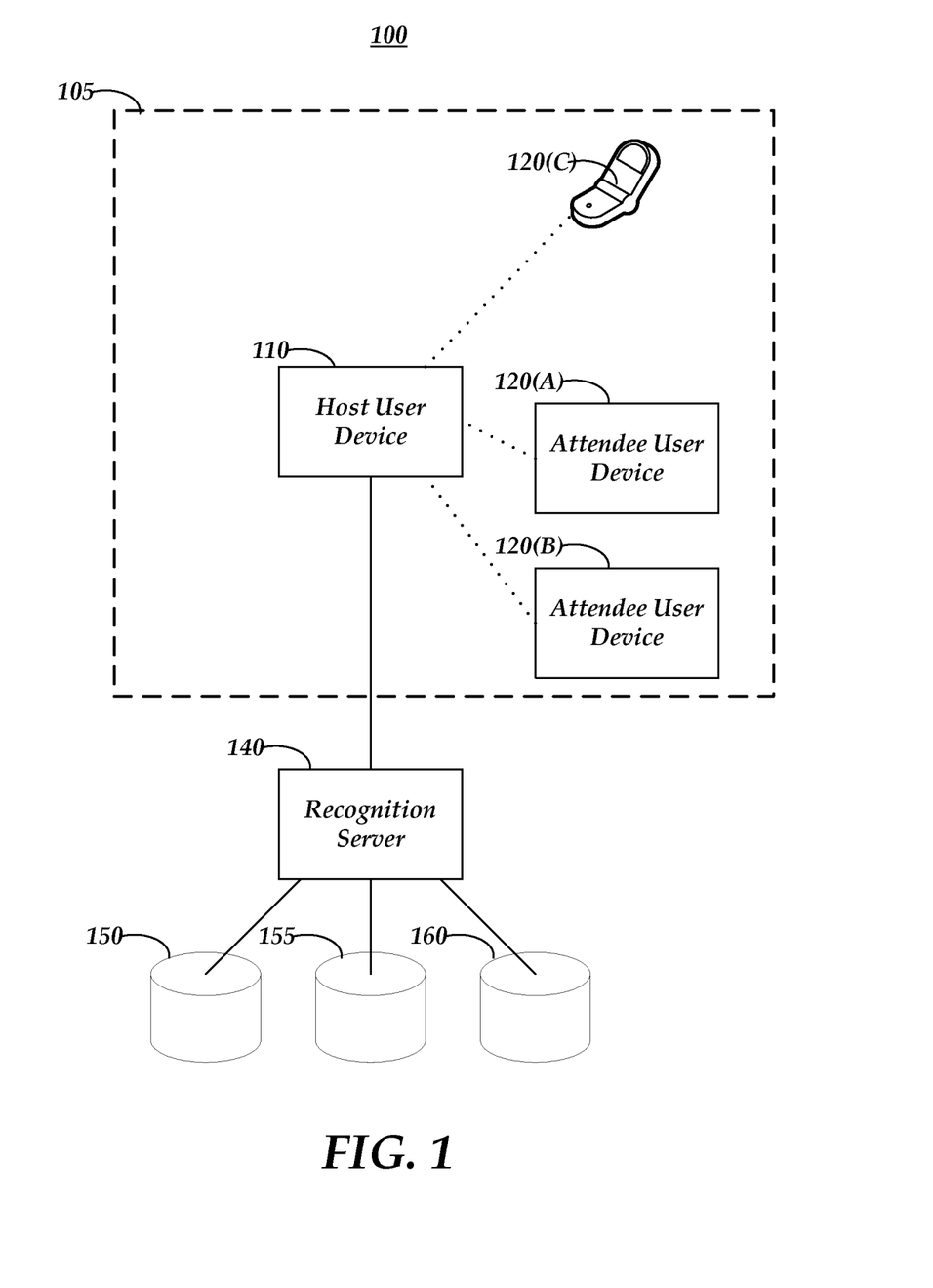
FIG. 1 is a block diagram of an operating environment.

FIG. 1 is a block diagram of an operating environment 100 for providing voice print identification. Operating environment 100 may comprise an event location 105 comprising a host user device 110 and a plurality of attendee user devices 120(A)-(C). Host user device 110 may comprise a computing device 400, described below in greater detail with respect to FIG. 4 and may comprise a recording device such as a microphone and/or a camera operative to record voices and/or images of attendees at an event. For example, several co-workers may be attending a meeting at event location 105, such as a conference room. Host user device 110 may record the meeting and may capture identity indicators associated with the attendees, such as device IDs (e.g., Bluetooth® and/or wireless network MAC addresses) associated with attendee user devices 120(A)-(C).

Host user device 110 may be operative to send the recording to another device operative to generate a voice print for each of the voices recorded during the meeting, such as a recognition server 140. Host user device 110 may also be operative to generate the voice prints itself and send them to recognition server 140. Recognition server 140 may be operative to create and/or manage an event presence database 150, an event attendee database 155, and/or an identity indicator database 160. Data associated with the voice prints and/or the event may be stored in these databases and may be periodically correlated to identify users associated with each of the voice prints. Consistent with embodiments of the invention, the data may be stored in a single database and/or spread out over multiple databases and tables.

Figure 2A:
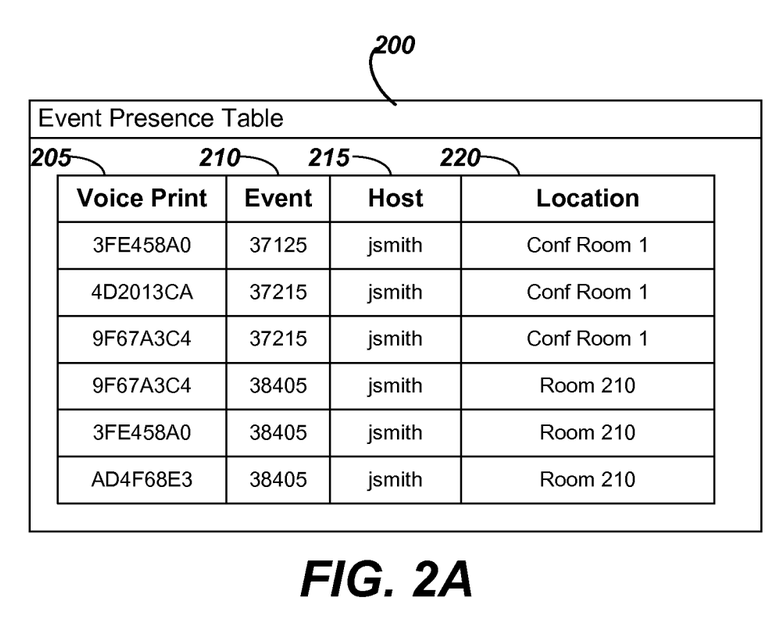
FIGS. 2A-2C are example tables used in providing voice print identification.

FIG. 2A illustrates an example event presence table 200. Event presence table 200 may comprise a plurality of rows each comprising data associated with a voice print column 205, an event column 210, a host column 215, and a location column 220. The data in voice print column 205 may correspond to voice prints generated by host user device 110. Data in event column 215 may be associated with a calendar event identifier created by a host user associated with host user device 110. Data in host column 215 may comprise a user identifier associated with the host user, and data in location column 220 may comprise a location identifier associated with event location 105.

Figure 2B:
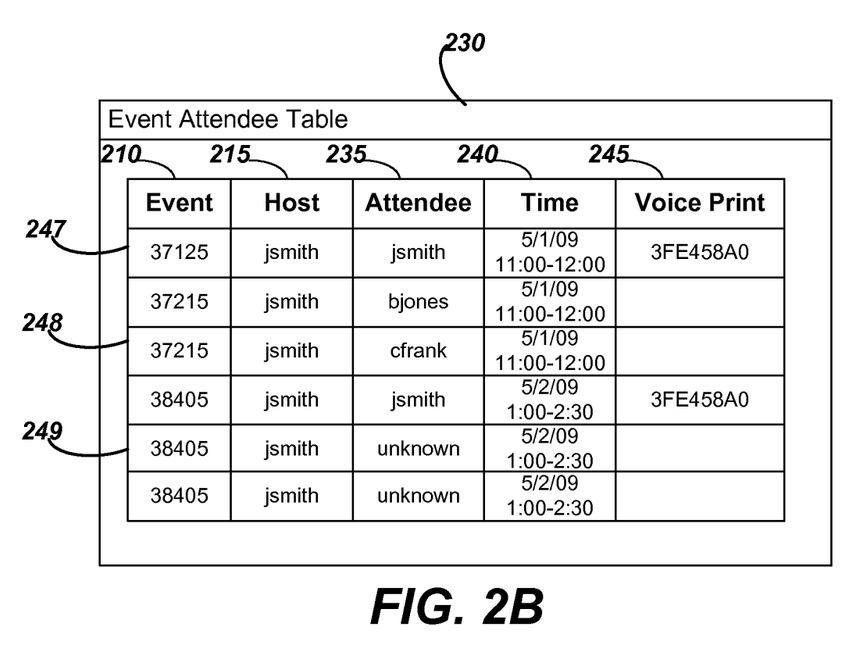

FIG. 2B illustrates an example event attendee table 200. Event attendee table 230 may comprise a plurality of rows each comprising data associated with an attendee column 235, a time column 240, and an attendee voiceprint column 245. Event attendee table 230 may also comprise event column 210 and host column 215 as index columns comprising the same data as found in those columns in event presence table 200. The data in attendee column 235 may correspond to a list of attendees associated with the event according to a calendar entry and/or manually entered by a user such as the host user. Data in time column 240 may be retrieved from the calendar event and/or may be entered according to a time when the recording occurred. Data in attendee voiceprint column 245 may comprise a known voice print associated with the attendee as identified in attendee column 235. For example, a host user may have a user identifier of "jsmith" and may have a known voice print, as illustrated in a first event attendee table row 247. An attendee user, "cfrank" may be known to have been at the event according to a calendar entry, but may not yet have an identified voice print, as illustrated in a second event attendee table row 248. Another event (i.e., an event having event identifier 38405) may not have an associated calendar event, but three voice prints may have been generated for attendees. One of the voice prints may be associated with the host user, jsmith, while unknown attendee rows may be created for the other two voice prints, as illustrated by third event attendee table row 249.

Figure 2C:
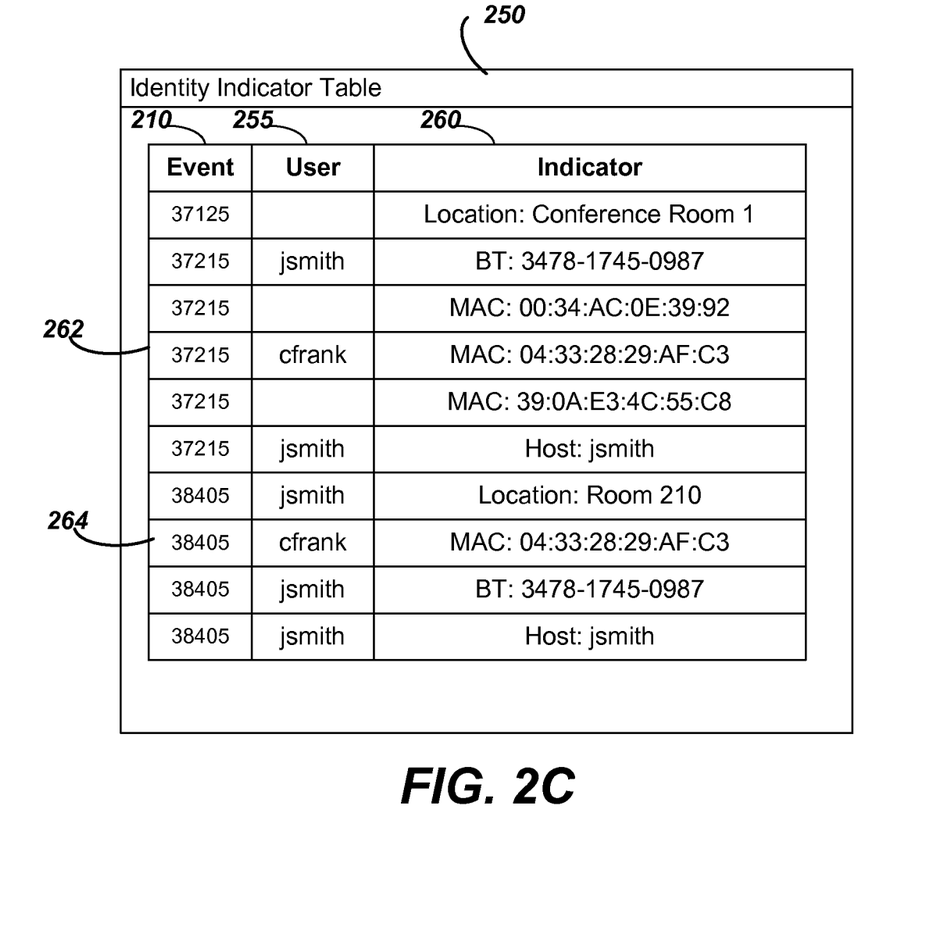

FIG. 2C illustrates an example identity indicator table 260. Identity indicator table 250 may comprise a plurality of rows each comprising data associated with a known user column 255 and an indicator column 260. Identity indicator table 250 may also comprise event column 210 as an index column comprising the same data as found in event column 210 in event presence table 200 and event attendee column 230. Identify indicator table 260 may be used to store ambient indicators associated with the recorded event that may be used to identify users at the event and match users to voice prints. For example, during an event having event identifier "37125", a location indicator, a Bluetooth® device ID, a host user, and three MAC addresses were recorded and stored in identity indicator table 250. Similarly, during an event having event identifier "38405", a host user, a location, a MAC address, and a Bluetooth® device ID may have been recorded.

Consistent with embodiments of the invention, a correlation between event presence table 200, event attendee table 230, and identity indicator table 250 may periodically be executed. This correlation may attempt to create a unique link between a user and a voice print. For example, as illustrated in a first indicator table row 262 and a second indicator table row 264, MAC address "04:33:28:29:AF:C3" may be known to be associated with a user "cfrank" and may have been present at events "37215" and "38405". The attendance of user cfrank at event "37215" may be correlated by second event attendee table row 248. This may result in cfrank being listed in attendee column 235 as a possible match for one of the unknown users at event "38405", such as in third event attendee table row 249. According to event presence table 200, three voice prints were associated with attendees at event "37125", two of which were also present during event "38405". One of the two common voice prints is known to belong to the host user "jsmith". Thus, the correlation may determine that the other common voice print should be associated with the user "cfrank". Further, this correlation may allow the identification of the third voice print at event "37215" to be associated with the only other attendee at that meeting, user "bjones". This data may be updated in event attendee table 230 and future recordings involving the voice prints of users "cfrank" and/or "bjones" may be immediately associated with those users. Other embodiments of the invention may use different table structures to accomplish a similar correlation.

Figure 3:
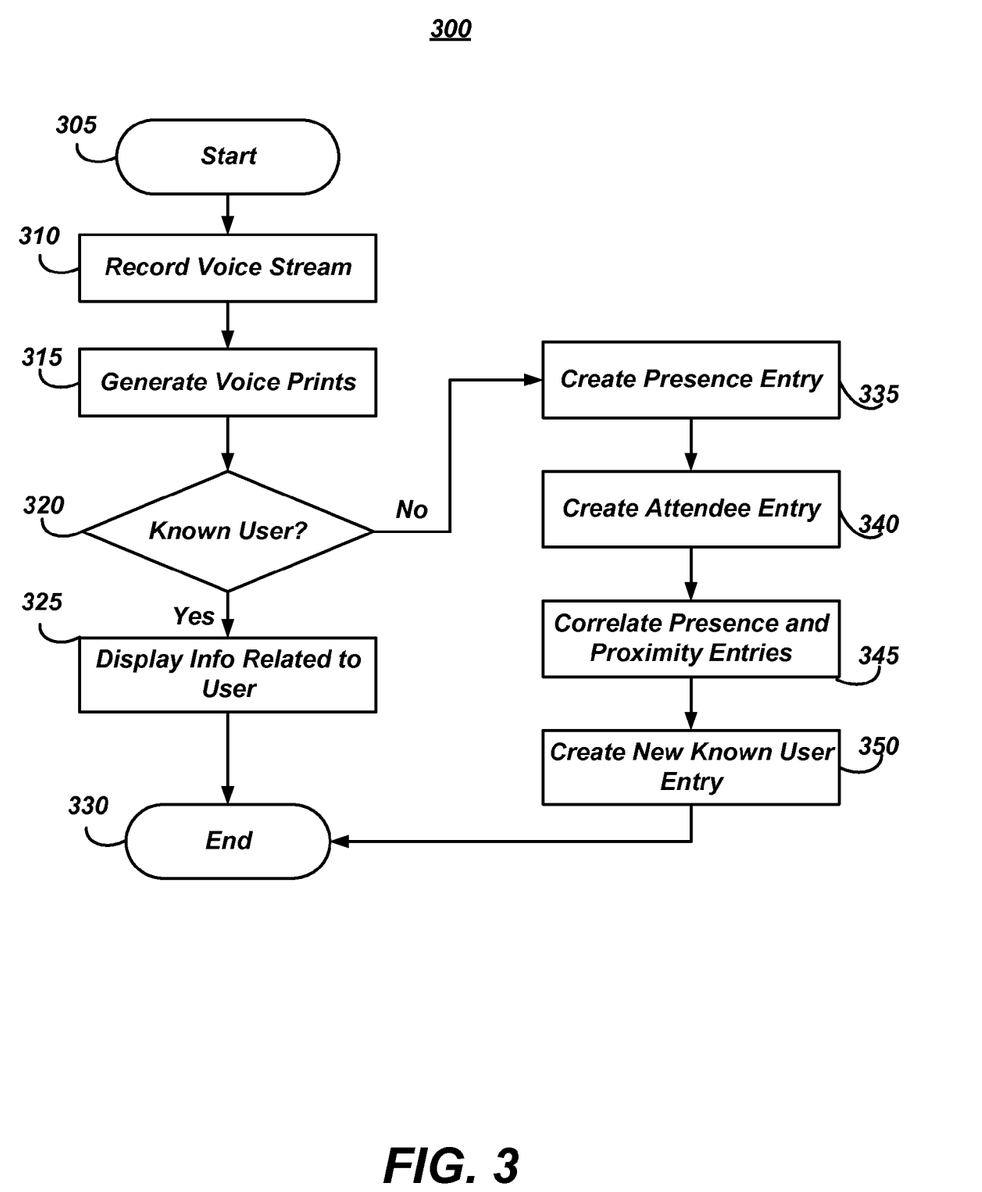
FIG. 3 is a flow chart of a method for providing voice print identification.

FIG. 3 is a flow chart setting forth the general stages involved in a method 300 consistent with an embodiment of the invention for providing voice print identification. Method 300 may be implemented using computing device 400 as described in more detail below with respect to FIG. 4. Ways to implement the stages of method 300 will be described in greater detail below. Method 300 may begin at starting block 305 and proceed to stage 310 where computing device 400 may record a voice stream. For example, host user device 110 may comprise a microphone and/or camera for recording voices and/or images during a meeting. Host user device 110 may also be operative to gather ambient identity indicators such as Bluetooth® device IDs and/or MAC addresses associated with wireless devices such as attendee user devices 120(A)-(C).

From stage 310, method 300 may advance to stage 315 where computing device 400 may generate a voice print for each of the recorded voices. For example, host user device 110 may use voice biometrics to digitize a profile of a user's speech to produce a stored model voice print.

After computing device 400 generates the voice prints in stage 315, method 300 may proceed to stage 320 where computing device 400 may determine whether any of the voice prints match a known user. For example, host user device 110 may lookup the voice print in a known user database to determine if the voice print is associated with another user within the host user's organization.

If the voice print is determined to match a known user at stage 320, method 300 may advance to stage 325 where computing device 400 may display an information element associated with the known user. For example, the host user may be on a phone call with a second user. The second user's voice print may be matched to a work team colleague of the host user and host user device 110 may display a list of recent emails received from the second user. Method 300 may then repeat for additional users or end at stage 330.

If the voice print is not matched with a known user at stage 320, method 300 may advance to stage 335 where computing device 400 may create an entry in a presence table. For example, host user device 110 may create an entry in event presence table 200 comprising the voice print, an event identifier, a host identifier (e.g., the user associated with host user device 110), and/or a location the recording took place.

From stage 335, method 300 may advance to stage 340 where computing device 400 may create an entry in an attendee table. For example, host user device 110 may create an entry in event attendee table 230 comprising the event identifier, the host identifier, at least one expected attendee, a time the recording took place, and/or a known voice print for the at least one expected attendee. The known voice print may be drawn from a known user database comprising associations between user identifiers and verified voice prints (i.e., voice prints comprising a sufficient confidence in the identification of a unique user).

From stage 340, method 300 may advance to stage 345 where computing device 400 may correlate entries in the presence and attendee tables. For example, host user device 110 may determine whether a given voice print occurred at different meetings and match that voice print to common attendees between the different meetings. In one scenario, a first meeting may be attended by User1, User2, User3, and User4, resulting in four voice prints, called A, B, C, and D. A second meeting may be attended by User1, User3, and User5, resulting in three voice prints called A, C, and E. Computing device 400 may thus correlate voice prints A and C with User1 and User3, though more data may be needed to uniquely identify which of voice prints A and C match with which of User1 and User3.

Similarly, computing device 400 may correlate voice prints, identity indicators, and expected attendees. In the scenario above, four identity indicators such as Bluetooth® device identifiers and/or wireless device MAC addresses may be identified and associated with each of the four voice prints (A, B, C, and D) of the first meeting. At the second meeting, three identity indicators may be identified and associated with the three voice prints (A, C, and E) present. If any of the four identity indicators from the first meeting are also present among the three identity indicators of the second meeting, the common identity indicators may be associated only with the common voice prints (A and C) while the distinct indicators may be associated with the distinct voice prints (B and D at the first meeting and E at the second meeting).

The identity Indicators may be narrowed down as more and more data becomes available until computing device 400 may uniquely identify user associated with a voice print and/or an identity indicator. For example, host user device 110 may associated a Bluetooth® device ID with a host user of the device and/or the host user's voice print by generating the user's voiceprint from a recording where that user's voice is the only one present (e.g., recording only the host user's side of a telephone call). Other identity indicators may be associated with specific users through the correlation of stage 345, such as where a voice print is known to be associated with a certain indicator that is present at a meeting, and a calendar entry associated with the meeting provides a list of attendee users at the meeting. The list of attendee users provides an initial list of possible users to match with the voice print/device identifier pair that may be narrowed down to a unique user through the correlation of additional data.

From stage 345, method 300 may advance to stage 350 where computing device 400 may create a new known user entry in a known user database and/or table. For example, once host user device 110 correlates a particular user with a voice print and/or identity indicator, it may store that data in a database table and/r other storage medium. That data may then be accessible the next time the voice print and/or identity indicator is encountered by host user device 110 and may be used to display related information, as described above with respect to stage 325. Once computing device 400 creates the known user entry in stage 350, method 300 may then end at stage 330.

An embodiment consistent with the invention may comprise a system for providing voice print identification. The system may comprise a memory storage and a processing unit coupled to the memory storage. The processing unit may be operative to record a plurality of speakers at an event, associate each of the plurality of recorded speakers with at least one identity indicator, create a plurality of voice prints, each associated with at least one of the plurality of recorded speakers, and determine whether at least one of the plurality of voice prints corresponds to a user according to the at least one identity indicator. If so, the processing unit may be operative to create a database entry associated with the user comprising the corresponding at least one of the plurality of voice prints and/or display at least one information element associated with the user.

The identity indicator used may comprise, for example, a location of the recording, a time of the recording, a caller ID, a device identifier, a host user, a calendar entry associated with the event, a recorded image, and a voice to text segment. The displayed information element may comprise, for example, a list of previous meetings with the corresponding user, contact information associated with the corresponding user, an email associated with the corresponding user, a document associated with the corresponding user, and social network information associated with the corresponding user.

The processing unit may be operative to create, update, delete, and/or modify database entries in a plurality of tables and/or storage devices to track identify indicators and associate voice prints with users. For example, the processing unit may be operative to create an event presence database entry comprising a voice print and event identifier for each of the plurality of speakers, an event attendee database entry comprising the event identifier associated with the event and a list of users at the event, and/or an identity indicator database entry comprising the event identifier and the at least one identity indicator associated with each of the plurality of recorded speakers. The processing unit may then be operative to correlate entries from the database and determine whether one of the plurality of voice prints is associated with a unique user according to the correlated entries.

The processing unit may also be operative to determine one of the plurality of voice prints is associated with less than a threshold number of possible users (i.e., narrow down the possible users that may be associated with the voice print.) The threshold number may be configurable on a system and/or user-by-user basis. If so, the processing unit may display a request to a host user to select which user should be associated with the voice print from among the possible users. For example, the processing unit may playback a sample of the recorded voice associated with the voice print and display a list of three possible users for the host user to select.

Another embodiment consistent with the invention may comprise a system for providing voice print identification. The system may comprise a memory storage and a processing unit coupled to the memory storage. The processing unit may be operative to generate a plurality of voice prints from an event recording, each associated with an attendee user at an event, create a new event presence database entry for at least one of the plurality of voice prints, and determine whether the at least one of the plurality of voice prints is associated with at least one prior event presence database entry. If so, the processing unit may be operative to correlate the identity indicator associated with the at least one prior event presence database entry with the identify indicator associated with the new event presence database entry, determine whether the correlated identity indicators uniquely identify a user associated with the at least one of the plurality of voice prints, and, if so, display at least one information element associated with the uniquely identified user. The processing unit may be operative to assign a confidence value for the uniquely identified user. The confidence value may be increased as the number of correlated identity indicators increases. Entries in the event presence database may all be associated with the same host user and/or may be associated with different host users, wherein the host user may comprise the user operating the device used to make the recording of the voices. Multiple host users may comprise, for example, different users within a single organization.

The processing unit may be further operative to determining whether the location of the recording is not associated with the uniquely identified user. If so, and one of the other voice prints from the event are not that of the uniquely identified user, the processing unit may determine whether the location of the recording is associated with a single user and, if so, associate the other voice print with the single user. For example, if the recording takes place in a user's assigned office between two people, the user who is a visitor to the office may be the uniquely identified user. In that case, the user whose office it is may be associated with the other voice print.

Yet another embodiment consistent with the invention may comprise a system for providing voice print identification. The system may comprise a memory storage and a processing unit coupled to the memory storage. The processing unit may be operative to record a voice stream associated with an event via a microphone coupled to the system, isolate a plurality of speakers associated with the voice stream, generate a plurality of voice prints, each associated with one of the plurality of speakers associated with the voice stream, and determine whether at least one voice print is associated with a known user. If so, the processing unit may be operative to display at least one informational element associated with the known user. Otherwise, the processing unit may be operative to create a presence entry in a presence database, create an attendee entry in an attendee database, periodically correlate a plurality of presence entries in the presence database with a plurality of attendee entries in the attendee database, and create a new known user entry in the known user database comprising the at least one voice print according to the periodic correlation of the plurality of presence entries with the plurality of proximity entries.

Figure 4:
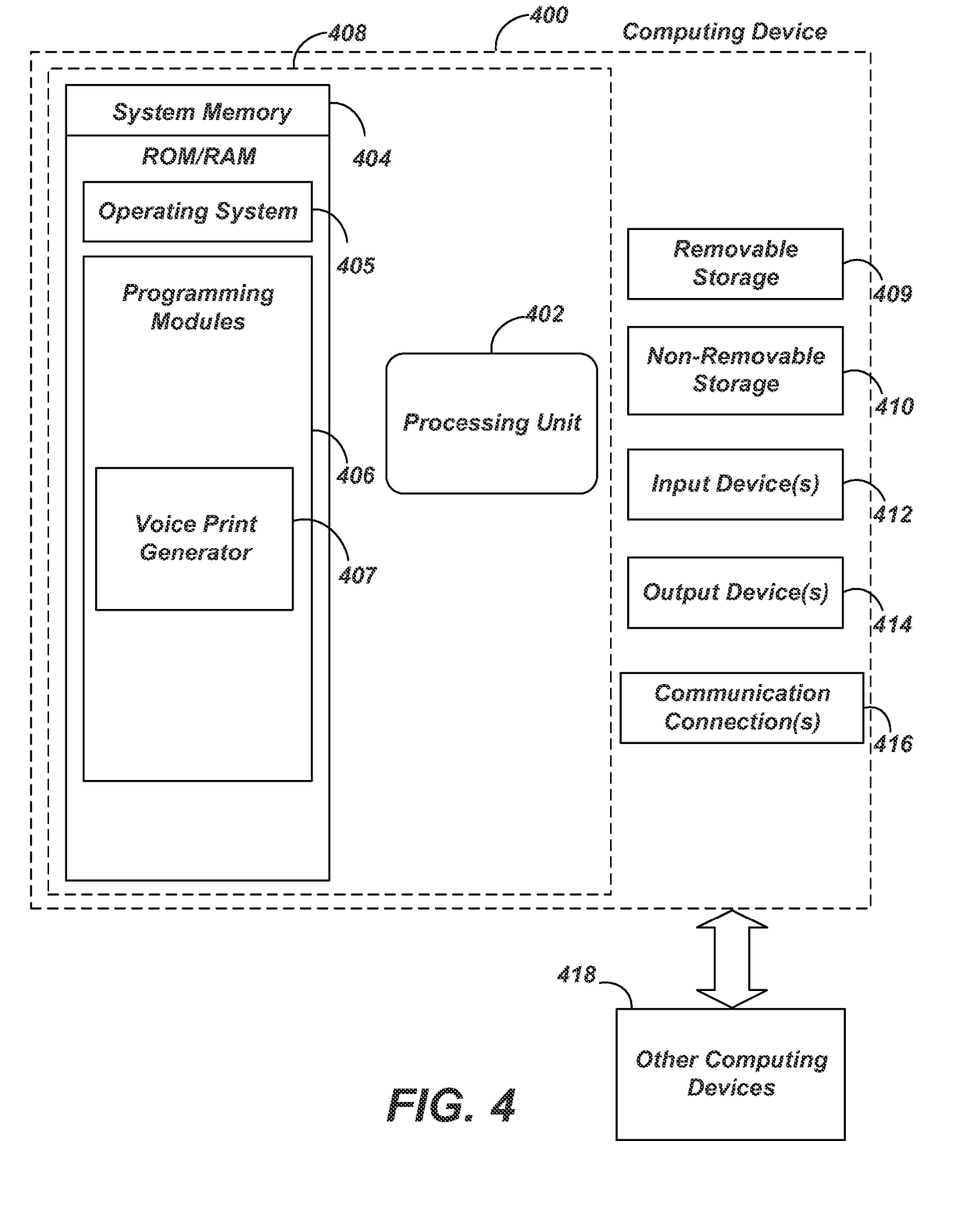
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise operating environment 100 as described above.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a voice print generator 407. Operating system 405, for example, may be suitable for controlling computing device 400's operation. In one embodiment, programming modules 406 may include voice print generator 407 that may operative to analyze recorded voices and create a voice print signature. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g., voice print generator 407) may perform processes including, for example, one or more of method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing voice print identification, the method comprising:
   recording a plurality of speakers at an event;
   associating each of the plurality of speakers with at least one identity indicator;
   creating a plurality of voice prints, each associated with at least one of the plurality of speakers;
   determining whether at least one of the plurality of voice prints corresponds to a user according to the at least one identity indicator;
   in response to determining that the at least one of the plurality of voice prints corresponds to the user, creating a database entry associated with the user comprising the corresponding at least one of the plurality of voice prints;
   in response to determining that the at least one of the plurality of voice prints does not correspond to the user, determining whether the at least one of the plurality of voice prints is associated with less than a threshold number of possible users; and
      in response to determining that the at least one of the plurality of voice prints is associated with less than a threshold number of a plurality of possible users, displaying a request to a host user to associate the at least one of the plurality of voice prints with a new known user from the plurality of possible users.

2. The method of claim 1, wherein the at least one identity indicator comprises at least one of the following: a location of the recording, a time of the recording, a caller ID, a device identifier, the host user, a calendar entry associated with the event, a recorded image, and a voice to text segment.

3. The method of claim 1, further comprising:
   in response to determining that the at least one of the plurality of voice prints corresponds to the user, displaying at least one information element associated with the user.

4. The method of claim 3, wherein the at least one information element comprises at least one of the following: a list of previous meetings with the corresponding user, contact information associated with the corresponding user, an email associated with the corresponding user, a document associated with the corresponding user, and social network information associated with the corresponding user.

5. The method of claim 1, further comprising:
   creating an event presence database entry for each of the plurality of speakers, wherein each database entry comprises a voice print associated with each of the plurality of speakers and an event identifier associated with the event.

6. The method of claim 5, further comprising:
   creating an event attendee database entry comprising the event identifier associated with the event and a list of users at the event.

7. The method of claim 6, wherein the event identifier associated with the event and the list of users at the event are identified according to a calendar entry associated with the event.

8. The method of claim 6, further comprising:
   creating an identity indicator database entry comprising the event identifier and the at least one identity indicator associated with each of the plurality of speakers.

9. The method of claim 8, wherein determining whether at least one of the plurality of voice prints corresponds to the user according to the at least one identity indicator comprises:
   correlating a plurality of speaker database entries, a plurality of event database entries, and a plurality of identifier database entries; and
   determining whether the at least one of the plurality of voice prints is associated with a unique user according to the correlated plurality of speaker database entries, plurality of event database entries, and the plurality of identifier database entries.

10. A computer-readable storage device which stores a set of instructions which when executed performs a method for providing voice print identification, the method executed by the set of instructions comprising:
   generating a plurality of voice prints from an event recording, wherein each of the plurality of voice prints is associated with an attendee user at the event;
   creating a new event presence database entry for at least one of the plurality of voice prints, wherein the new event presence database entry comprises the at least one of the plurality of voice prints, an event identifier associated with the event, and an identity indicator associated with the event;
   determining whether the at least one of the plurality of voice prints is associated with at least one prior event presence database entry; and
   in response to determining that the at least one of the plurality of voice prints is associated with the at least one prior event presence database entry:
      correlating the identity indicator associated with the at least one prior event presence database entry with the identify indicator associated with the new event presence database entry,
      determining whether the correlated identity indicators uniquely identify a user associated with the at least one of the plurality of voice prints,
      in response to determining whether the correlated identity indicators uniquely identify the user associated with the at least one of the plurality of voice prints, displaying at least one information element associated with the uniquely identified user;
      in response to determining that the at least one of the plurality of voice prints does not correspond to the user, determining whether the at least one of the plurality of voice prints is associated with less than a threshold number of possible users; and in response to determining that the at least one of the plurality of voice prints is associated with less than a threshold number of a plurality of possible users, displaying a request to a host user to associate the at least one of the plurality of voice prints with a particular user from the plurality of possible users.

11. The computer-readable storage device of claim 10, further comprising:

assigning a confidence value for the uniquely identified user.

12. The computer-readable storage device of claim 11, further comprising:

determining whether a voice print associated with a current speaker and the identity indicator associated with the current speaker match the voice print and the identity indicator associated with the uniquely identified user, and in response to determining that the voice print associated with the current speaker and the identity indicator associated with the current speaker match the voice print and the identity indicator associated with the uniquely identified user, increasing the confidence value associated with the uniquely identified user.

13. The computer-readable storage device of claim 10, wherein the new event presence database entry and the at least one prior event presence database entry are each associated with a single host user.

14. The computer-readable storage device of claim 10, wherein the new event presence database entry and the at least one prior event presence database entry are each associated with a different host user.

15. The computer-readable storage device of claim 14, wherein the host user associated with the new event presence database entry and the host user associated with the at least one prior event presence database entry are both associated with a single organization.

16. The computer-readable storage device of claim 10, wherein the identity indicator comprises at least one of the following: a location of the recording, a time of the recording, a caller ID, a device identifier, the host user, a calendar entry associated with the event, a recorded image, and a voice to text segment.

17. The computer-readable storage device of claim 16, further comprising:

determining whether the location of the recording is not associated with the uniquely identified user;

in response to determining that the location of the recording is not associated with the uniquely identified user, determining whether one of the plurality of voice prints is not associated with the uniquely identified user;

in response to determining that one of the plurality of voice prints is not associated with the uniquely identified user, determining whether the location of the recording is associated with a single user; and in response to determining that the location of the recording is associated with the single user, associating the one of the plurality of voice prints with the single user.

18. The computer-readable storage device of claim 10, wherein the at least one information element comprises at least one of the following:

a list of previous meetings with the corresponding user, contact information associated with the corresponding user, an email associated with the corresponding user, a document associated with the corresponding user, and social network information associated with the corresponding user.

19. A system for providing voice print identification, the system comprising:

a memory storage; and a processing unit coupled to the memory storage, wherein the processing unit is operative to:

record a voice stream associated with an event via a microphone coupled to the system, isolate a plurality of speakers associated with the voice stream, generate a plurality of voice prints, each associated with one of the plurality of speakers associated with the voice stream, determine whether at least one voice print is associated with a known user, wherein being operative to determine whether the at least one voice print is associated with the known user comprises being operative to determine whether a known user entry in a known user database comprising a plurality of users associated with an organization comprises the at least one voice print, in response to determining that the at least one voice print is associated with a known user, display at least one informational element associated with the known user, wherein the at least one informational element comprises at least one of the following:

an e-mail associated with the known user, a document associated with at least one prior meeting with the known user, a speaker identification of the known user, and a contact data associated with the known user, in response to determining that the at least one voice print is not associated with the known user:

create a presence entry in a presence database comprising the at least one voice print, a location associated with the voice stream, a time associated with the voice stream, a device identifier associated with the system, a host user identifier associated with the system, and at least one ambient indicator associated with the voice stream, and create an attendee entry in an attendee database comprising the host user identifier associated with the system, an event identifier associated with the event, a calendar entry associated with the event, a beginning time associated with the event, an end time associated with the event, and at least one expected user associated with the event, periodically correlate a plurality of presence entries in the presence database with a plurality of attendee entries in the attendee database, wherein the plurality of presence entries and the plurality of attendee entries are associated with the plurality of users associated with the organization, and create a new known user entry in the known user database comprising the at least one voice print according to a periodic correlation of the plurality of presence entries with the plurality of attendee entries, wherein the periodic correlation includes determining whether the at least one voice print is associated with less than a threshold number of possible users, and in response to determining that the at least one of the plurality of voice prints is associated with less than a threshold number of a plurality of possible users, displaying a request to a host user to associate the at least one of the plurality of voice prints with the known user from the one of the plurality of attendee entries.

20. The system of claim 19, further comprising: assigning a confidence value for the known user.

\* \* \* \* \*